Feb. 28, 1961  C. H. WEBBER ET AL  2,973,296
METHOD OF ATTACHING A PLASTIC FITTING TO A PLASTIC MAIN
Original Filed Oct. 5, 1955  4 Sheets-Sheet 1

INVENTORS
CLAUDE H. WEBBER
FRANK H. MUELLER
BY
Cushman, Darby & Cushman
ATTORNEYS INVENTORS
CLAUDE H. WEBBER
FRANK H. MUELLER
BY
Cushman, Darby & Cushman
ATTORNEYS INVENTORS
CLAUDE H. WEBBER
FRANK H. MUELLER
BY Cushman, Darby & Cushman
ATTORNEYS INVENTORS
CLAUDE H. WEBBER
FRANK H. MUELLER
BY Cushman, Darby & Cushman
ATTORNEYS

United States Patent Office 2,973,296
Patented Feb. 28, 1961

2,973,296

METHOD OF ATTACHING A PLASTIC FITTING TO A PLASTIC MAIN

Claude H. Webber, South Laguna, Calif., and Frank H. Mueller, Decatur, Ill., assignors to Mueller Co., Decatur, Ill., a corporation of Illinois Continuation of application Ser. No. 538,704, Oct. 5, 1955, now Patent No. 2,933,126, dated Apr. 19, 1960. This application Jan. 8, 1960, Ser. No. 1,287

3 Claims. (Cl. 154—116)

This invention relates to plastic pipes and more particularly to a method of attaching a plastic service T or other fitting, of the general type disclosed in Frank H. Mueller Patent 2,839,075, issued June 17, 1958, to a plastic main. This application constitutes a division of my co-pending application, S.N. 538,704, now Patent No. 2,933,126.

A fitting such as disclosed in the above entitled patent, comprises in general, a service T having a flanged saddle for engagement with and solvent-welding to a plastic main and a closure and coupon-cutting plug operable to internally communicate the fitting with the main while the latter is pressurized. One of the difficulties encountered in the use of this service T occurs because plastic mains when buried in the earth have a tendency to become squashed and semi-permanently deformed out of perfect roundness due to the weight of the earth above. When the main is out of perfect roundness, it does not perfectly mate with the flanged saddle of the fitting and hence, the solvent-weld between the fitting and main is detrimentally affected.

It is therefore an object of the present invention to provide a method of solvent-welding a plastic fitting of the type described to a plastic main which will insure accurate mating between the flanged saddle of the fitting and the outer periphery of the main so as to enable the two parts to be securely bonded together.

With the use of the fitting disclosed in the above entitled patent, it is necessary first to test the completed bond of the fitting to the main before the closure and coupon-cutting plug is operated. By the aid of the present invention, however, it is possible to operate the closure and coupon-cutting plug before the weld has actually set because of the insured firm engagement of the fitting and main afforded by the clamp of the present invention. In this manner, the present invention effects a saving in installation time over methods heretofore utilized.

Accordingly, a still further object of the invention is the provision of a method of the type described in which a circumferential pressure is supplied around substantially the entire periphery of a plastic main to shape the same and bring it into perfect roundness and to secure the flanged saddle of a fitting in conformed engagement with the shaped portion of the main during the welding and coupon-cutting operations to therefore positively insure a firm welding bond and also to make it possible to reduce the time heretofore required to complete the entire fitting attachment operation.

These and other objects of the present invention will become more apparent during the course of the following detailed description and appended claims.

The invention may best be understood with reference to the accompanying drawings wherein an illustrative embodiment is shown.

Figure 1:
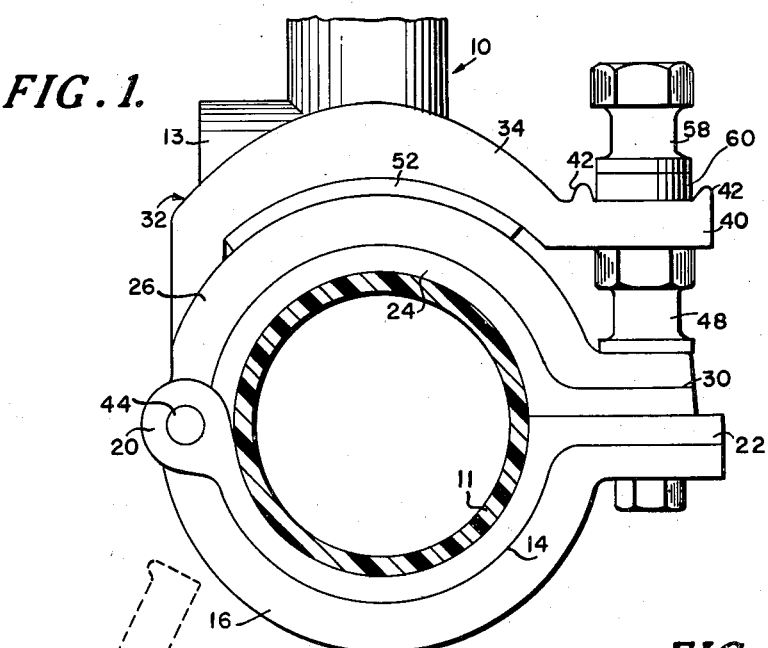
Figure 1 is a side elevational view of a clamp embodying the present invention showing the same as applied to a plastic main and plastic service T.
Figure 4:
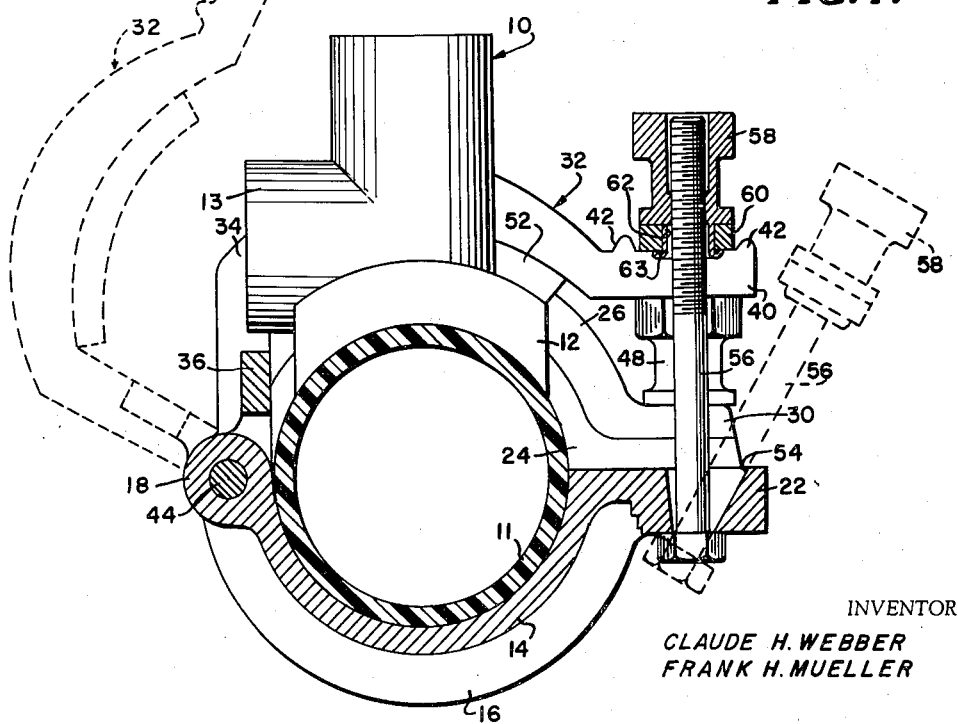
Figure 4 is a cross sectional view taken along the line 4—4 of Figure 2.

Referring now more particularly to the drawings, there is shown a fitting 10, of the plastic service T type such as disclosed in the above mentioned application, bonded to a plastic main 11 with the aid of the clamp of the present invention. As set forth in the aforementioned application, the service T fitting 10 includes a main through bore having a flanged saddle 12 at the inlet end thereof provided with a lower, perfectly round concave, surface adapted to engage the periphery of the main, and a lateral branch pipe outlet 13 communicating therewith. A closure and coupon-cutting plug (not shown) is threadedly mounted in the main through bore for the purpose of internally communicating the fitting to the main while the latter is pressurized.

One form of the clamp of the present invention is shown in Figures 1–4 and comprises a first clamping section 14 of semi-cylindrical shape, the inner surface of which, is adapted to engage the outer periphery of the plastic main 11 at a position substantially diametrically opposed to the engagement of the fitting 10 therewith. The clamping section 14 is preferably provided with three spaced parallel ribs 16 which serve to strengthen the section. Adjacent one side of the clamping section 14, there is provided a central apertured pivot lug 18 and pairs of spaced apertured pivot lugs 20 are disposed on each side of the central lug 18. The opposite side of the section 14 is formed into an outwardly extending flange 22 for a purpose which will become apparent hereinafter.

Connected to the first clamping section 14, adjacent opposite ends thereof, is a pair of complementary end clamping sections 24 which cooperate with the first clamping section to apply a circumferential shaping pressure throughout substantially the entire periphery of the plastic main 11 adjacent both ends of the clamp. Each of the complementary clamping sections 24 includes a central rib 26, one end of which terminates in an apertured lug 28 arranged to be disposed between an associated pair of the spaced lugs 20. The opposite end of each of the clamping sections 24 is provided with an outwardly extending flange 30 adapted to register with the adjacent portion of the outwardly extending flange 22 of the clamping section 14.

Disposed between the spaced clamping sections 24 is a fitting-engaging complementary clamping section 32 which preferably comprises a pair of spaced ribbed arms 34 interconnected adjacent one end thereof as by a rigid transverse connecting member 36. Each of the ribbed arms 34 terminates in an apertured lug 38 adjacent the connecting member 36 and the opposite end of each arm is provided with an outwardly extending flange 40 having a pair of spaced, upwardly extending projections 42 thereon for a purpose hereinafter to be described.

The clamping sections 24 and 32 have their respective lugs 28 and 38 pivotally connected with the lugs 20 and 18 respectively of the first clamping section preferably by means of a single pivot pin 44 extending through the registering apertures formed in the various lugs. The outwardly extending flange 30 of each clamping section 24 is connected with the adjacent outwardly extending flange 22 of the first clamping member by means of any suitable fastening means, such as a bolt 46, extending through a suitable upwardly tapering aperture in the flange 22 and a registering slot 50 formed in the flange 30 and a cooperating nut 48.

The central portion of the undersurface of the arms of the clamping section 32 are preferably provided with cushion pads 52 of rubber or other suitable material which are adapted to engage the flanged saddle of the fitting. An upwardly tapering aperture 54 is formed in the center of the outwardly extending flange 22 of the section 14 for receiving a bolt 56, the upper end of which carries a nut 58. A bar 60 is disposed above the flanges 40 on the arms 34 and bridges the space therebetween. The bar is provided with a central aperture 62 through which the bolt 56 extends and the nut 58 is preferably swivelly connected therewith by means of an integral annular skirt 63 extending through the aperture 62 and deformed outwardly against the undersurface thereof. In this manner, the bar is at all times interconnected with the nut, but the latter is free to rotate with respect to the bar to secure the sections 32 and 14 together.

Figure 2:
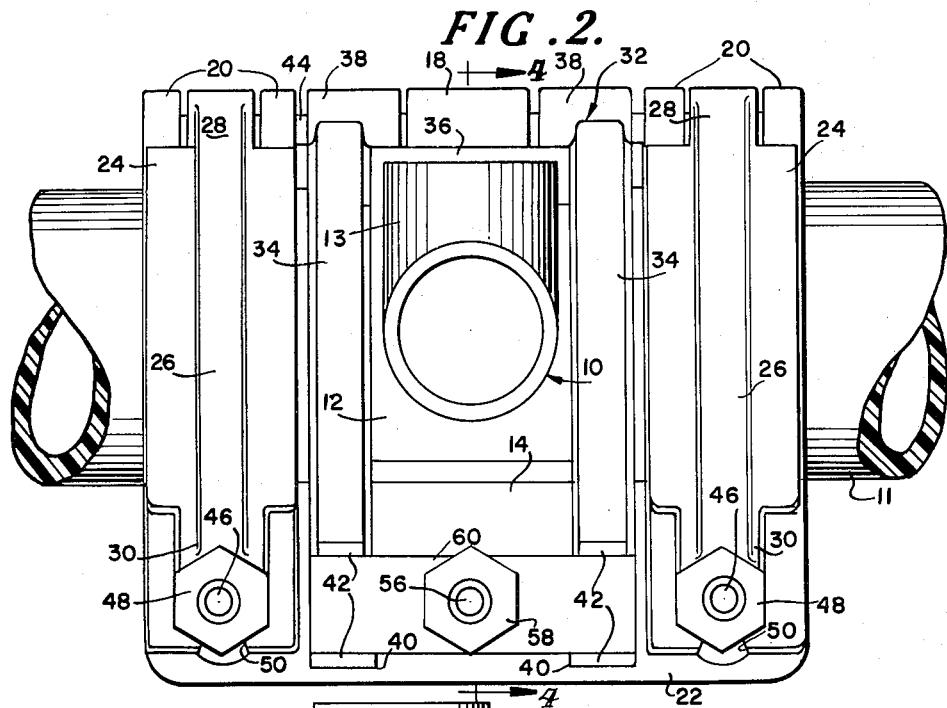
Figure 2 is a plan view of the clamp shown in Figure 1.
Figure 3:
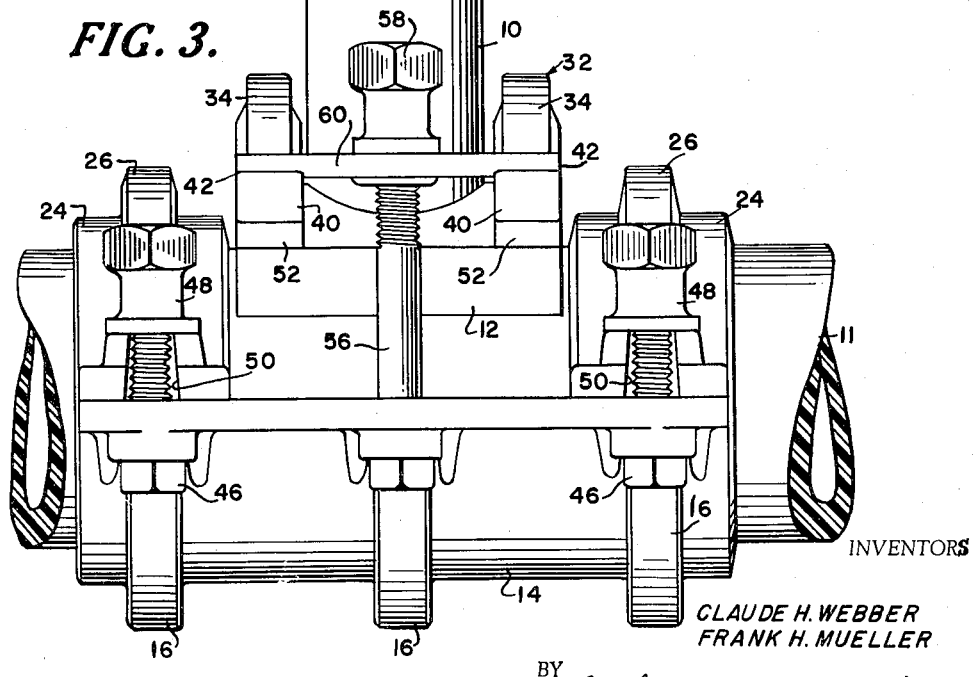
Figure 3 is a front elevational view thereof.
Figure 5:
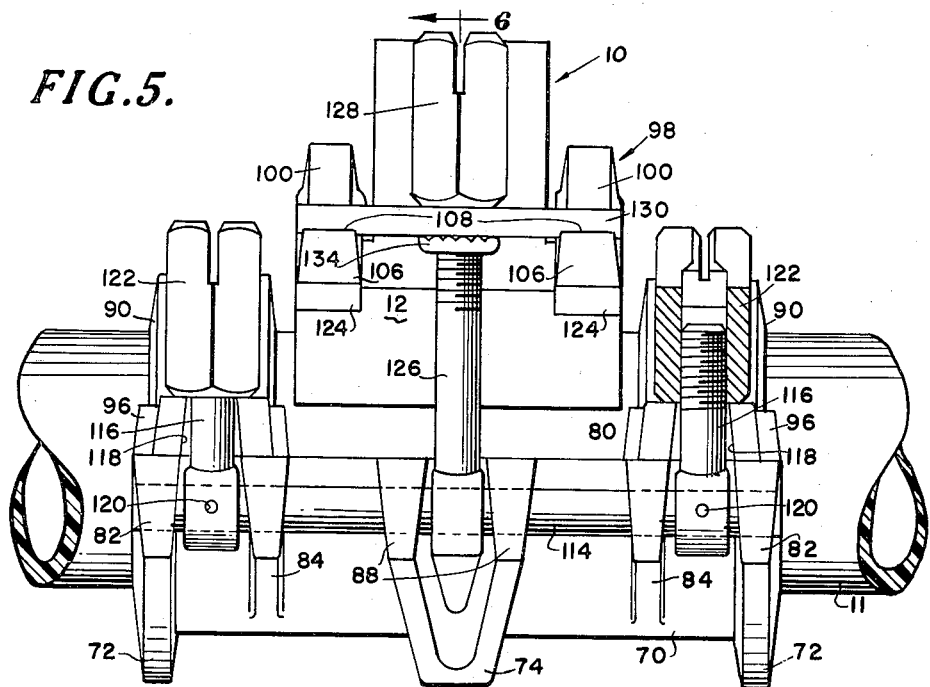
Figure 5 is a view similar to Figure 3 showing a modified embodiment of the invention.
Figure 6:
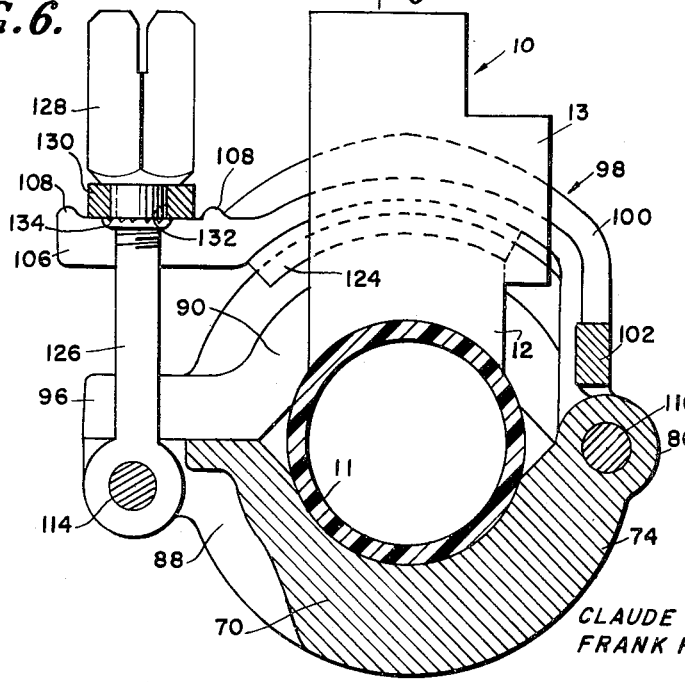
Figure 6 is a cross-sectional view taken along the line 6—6 of Figure 5.

In using the clamp of the present invention in conjunction with the solvent-welding of the fitting of the type described in the above mentioned application, the first clamping section 14 is first brought into engagement with the outer periphery of the main 11 in a position substantially diametrically opposed to the position where the fitting is to be engaged. The spaced complementary clamping sections 24 are then pivoted into engagement with the outer periphery of the main and the nuts 48 are tightened on the bolts 46 to bring the clamping sections into registry. If the plastic main has been squashed out of perfect roundness due to the weight of the earth above it during the time it was buried, the movement of the complementary clamping sections 24 into registry with the first clamping section 10 will apply a circumferential pressure about substantially the entire periphery of the plastic main so as to shape the same and bring it into perfect roundness. As can be seen in Figures 2 and 3, the portion of the plastic main between the spaced sections 24 will be shaped into perfect roundness by the action of the clamping sections together so as to provide a surface which will perfectly mate and conform to the flanged saddle of the fitting 14.

An appropriate solvent is then applied to the shaped portion of the main to be engaged by the saddle and to the flanged saddle of the fitting and the latter is then positioned on the main in the manner described in the aforementioned application. The clamping section 32 may then be pivoted from a position, such as shown in dotted lines in Figure 4, into the full line position wherein the cushion pads 52 engage the flanges of the saddle 12. It will be noted that the arms 34 are spaced apart sufficiently to straddle the fitting during their pivotal movement into engagement with flanged saddle 12. The bar 60 swivelly attached to nut 58 may then be centered between projections 42 and finally nut 58 is tightened to firmly secure the fitting into conformed engagement with the shaped portion of the main. In this manner, the portion of the plastic main which is solvently welded to the fitting presents a shaped portion positively held in perfect roundness which will conformingly engage the flanged saddle of the fitting over its entire surface thus insuring a firm welded bond throughout the entire area of mutual contact.

With the fitting applied to the main in the manner described above, the steps of testing the weld and subsequently cutting out a coupon so as to internally communicate the fitting with the main may be carried out in the manner set forth in the above mentioned application.

A particular feature of the present invention is that because of the insurance which the clamp provides for obtaining a firm weld, it is possible to proceed immediately with the coupon-cutting operation after the fitting has been suitably tested without the necessity of waiting until the weld has completely set. In other words, due to the presence of the clamp, it is possible to test the connection between the fitting and the main before the weld has actually set and to subsequently perform the coupon cutting operation while the weld is setting if the test proves it to be leak-proof. In this manner, the clamp of the present invention secures a saving in installation time over the procedures heretofore utilized.

In view of the above, it is preferable that the clamp remain in engagement with the main and fitting during the coupon-cutting operation, and after sufficient time is allowed to permit the weld to completely set, the clamp may be removed to be used in installing other fittings.

In Figures 5–8 there is shown a somewhat modified form of clamp embodying the principles of the present invention. The modified clamp comprises a first clamping section 70 of semi-cylindrical shape, the inner surface of which is adapted to engage the outer periphery of the plastic main 11 at a position substantially diametrically opposed to the engagement of the fitting 10 therewith. The clamping section 70 preferably includes a relatively thin rib 72 disposed on each end thereof and a relatively thick rib 74 is disposed on the central portion thereof. At one side of the clamping section, the ribs 72 terminate in apertured pivot lugs 76 and a cooperating apertured pivot lug 78 is formed on the clamping section in spaced relation to each lug 76. The opposite side of the clamping section 70 is formed into a relatively short outwardly extending flange 80 and the adjacent terminal side of the ribs 72 project outwardly beyond the flange to form apertured pivot lugs 82. A cooperating apertured pivot lug 84 is formed on the clamping section in spaced relation to each lug 82 and in alignment with a corresponding lug 78.

The central rib 74 terminates at the side of the clamping section adjacent lugs 78 in an apertured pivot lug 86 and the opposite side thereof is bifurcated to provide a pair of centrally disposed, spaced apertured pivot lugs 88.

A pair of complementary end clamping sections 90 are disposed on opposite ends of the clamping section 70 and cooperate therewith to apply a circumferential shaping pressure throughout substantially the entire periphery of the plastic main 11 in the manner previously indicated. These clamping sections are similar to the clamping sections 24 previously described and each includes a central rib 92, one end of which terminates in an apertured pivot lug 94 arranged to be disposed between an associated pair of cooperating pivot lugs 76 and 78. The opposite end of each clamping section 90 is provided with an outwardly extending flange 96 adapted to register with the adjacent portion of flange 80 and pivot lugs 82 and 84.

Disposed centrally between clamping sections 90, is a fitting-engaging complementary clamping section 98 which is similar to the section 32 previously described and includes a pair of spaced ribbed arms 100 interconnected adjacent one end thereof as by a rigid transverse connecting member 102. Each of the ribbed arms 102 terminates in an apertured pivot lug 104 adjacent the connecting member 102 and the opposite end of each arm is provided with an outwardly extending flange 106 having a pair of spaced, upwardly extending projections 108 thereon, similar to the projections 42 previously described.

Figure 7:
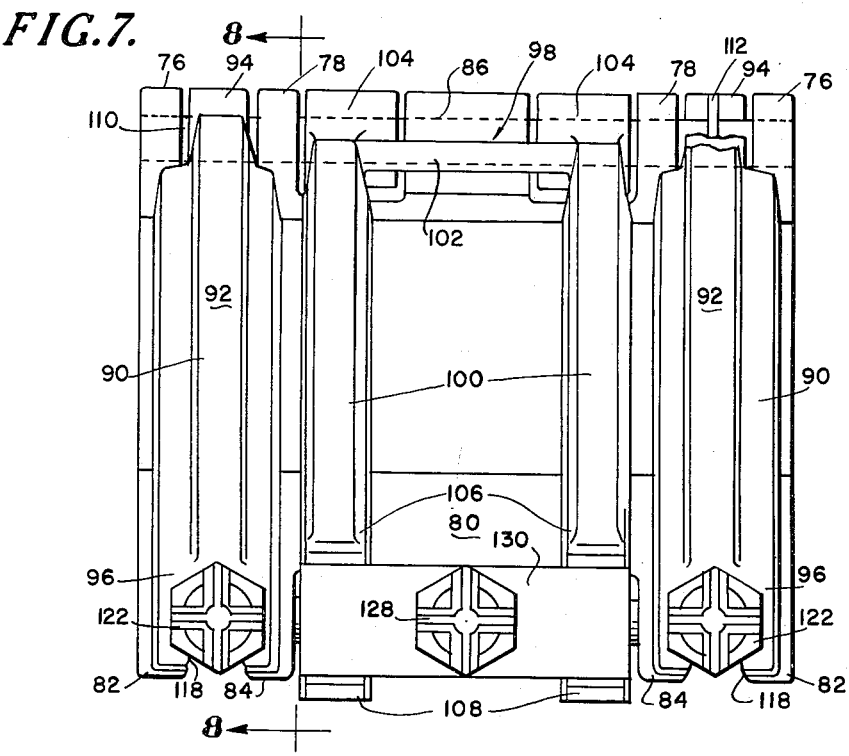
Figure 7 is a top plan view of the clamp shown in Figure 5.
Figure 8:
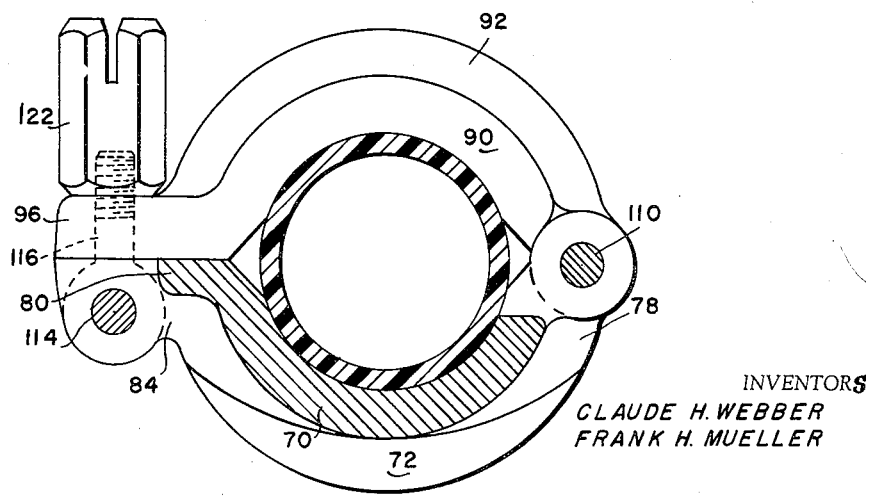
Figure 8 is a cross-sectional view taken along the line 8—8 of Figure 7.

A pivot pin 110 extends through the registering apertures of lugs 76, 94, 78, 104 and 86 so as to pivotally interconnect the complementary clamping sections 90 and 98 with the first clamping section 70. Lugs 94 of clamping sections 90 are rigidly secured to the pivot pin 110 by any suitable means, such as fastening elements 112 extending within registering holes formed in the lugs and the pin (Figure 7). In this manner, the clamping sections 90 are rigidly interconnected by the pivot pin so that the same are pivotal together. It will also be noted that fastening elements 112 serve to maintain the pivot pin in position within the various lugs interconnected thereby. Furthermore, it will be understood that the lugs 28 of the previously described clamp may likewise be rigidly interconnected with the pin 44, if desired.

A second pivot pin 114 extends through the registering apertures formed in lugs 82, 84 and 88 on the first clamping section 70. Secured to the pivot pin 114 between each pair of cooperating lugs 82 and 84 is an eye-bolt 116 arranged to enter a cooperating tapered slot 118 formed in the flange 96 of the corresponding clamping section 90. Eye-bolts 116 are likewise rigidly connected with pivot pin 114 by any suitable means, such as fastening elements 120, which serve to connect the bolts, for pivotal movement together and to maintain the pivot pin in proper axial position. The upper end of eye-bolts 116 are threaded to receive cooperating nuts 122 which may be hexagonal in cross-section and provided with intersecting transverse tool slots at their upper ends. The use of these nuts is preferred since they enable the operator to use the same wrench, which he will use to drill the plastic service T, to tighten the nuts. Moreover, since the nuts are made from hexagonal stock, an ordinary wrench could be used if the drilling wrench for the plastic T is not available.

As before, the central portion of the undersurface of the arms 100 of the clamping section 98 are preferably provided with cushion pads 124 of rubber or other suitable material which are adapted to engage the flanged saddle of the fitting. A central eye-bolt 126 is pivotally mounted on the pin 114 between lugs 88 and carries at its upper end a nut 128 constructed similarly to the nuts 122. A bar 130 is disposed above flanges 106 on the arms 100 and bridges the space therebetween. This bar is provided with a central aperture 132 through which the bolt 126 extends and the nut 128 is preferably swively connected therewith by means of an integral or rigidly connected annular skirt 134 extending through the aperture 132 and deformed outwardly against the undersurface of the bar in the manner previously described in connection with the clamp of Figures 1–4.

The clamp illustrated in Figures 5–8 operates in the same manner to effect an efficient union between the plastic main and the plastic service T as the clamp of Figures 1–4. The clamp of Figures 5–8 is preferred, however, in that the same offers many operating advantages. For example, in the latter construction, the end clamping sections are effectively interconnected so that pivotal movement of one into its clamping position will also move the other into its clamping position. Moreover, by virtue of the eye-bolt construction, the two end sections may initially be secured in substantially clamped position by pivotal movement of either bolt. Furthermore the eye-bolt construction permits easier operation since they may be more easily positioned within their corresponding slots than the slidable bolts 50 of the embodiment of Figures 1–4.

It will also be noted that the arms 100 of the clamp of Figures 5–8 are constructed and positioned so as to allow the operator to more freely observe the joint between the saddle and the plastic main during the solvent welding operation so that he may see when the solvent is extruded at this point during the operation. In addition, the transverse connecting member 102 is likewise positioned to permit observance of the junction between the saddle and the main.

It is to be understood that the form of the invention herewith shown and described is to be taken as the preferred embodiment of the same and that various changes may be made without departing from the spirit of the invention or the scope of the appended claims.

We claim:

1. A method of securing a plastic fitting having a flanged saddle to a plastic main having a pressurized fluid therein which comprises: applying a solvent to a portion of said main and to the flanged saddle of said fitting; applying an external circumferential pressure to said main around substantially the entire periphery thereof adjacent said portion to shape the same and bring it into perfect roundness; positioning the fitting on the main with their solvent applied surfaces in conformed engagement; maintaining said circumferential pressure until the solvent has set to weld the fitting and main together; and then removing said circumferential pressure.

2. A method of securing a plastic fitting having a flanged saddle and a closure and coupon-cutting plug to a plastic main having a pressurized fluid therein which comprises: applying a solvent to a portion of the main and to the flanged saddle of the fitting; applying an external circumferential pressure to the main around substantially the entire periphery thereof adjacent said portion to shape the same and bring it into perfect roundness, and to position and hold the fitting on the main with their solvent applied surfaces in conforming engagement; maintaining said circumferential pressure until the solvent has set to weld the fitting and main together; operating the plug to internally communicate the fitting with the main while said circumferential pressure is applied; and then removing said circumferential pressure.

3. A method of securing a plastic fitting having a flanged saddle and a closure and coupon-cutting plug to a plastic main having a pressurized fluid therein which comprises: applying a circumferential clamping pressure to the main around substantially the entire periphery thereof to shape a portion of the main and bring it into perfect roundness; applying a solvent to the shaped portion of said main and to the flanged saddle of the fitting; clamping the fitting to the main with their solvent applied surfaces in conforming engagement; maintaining said circumferential pressure until the solvent has set to weld the fitting and main together; operating the plug to internally communicate the fitting with the main while the latter is clamped into engagement with the fitting, releasing the clamping of the fitting and main; and removing said circumferential pressure.

References Cited in the file of this patent

UNITED STATES PATENTS 2,850,422    Welch _____ Sept. 2, 1958